United States Patent [19]

Keller

[11] Patent Number: 4,544,840
[45] Date of Patent: Oct. 1, 1985

[54] FIBER OPTIC FLUID IMPURITY DETECTOR

[75] Inventor: Christian A. Keller, Baltimore, Md.

[73] Assignee: The Johns Hopkins University, Baltimore, Md.

[21] Appl. No.: 577,569

[22] Filed: Feb. 6, 1984

Related U.S. Application Data

[62] Division of Ser. No. 271,640, Jun. 8, 1981, Pat. No. 4,443,699, which is a division of Ser. No. 71,704, Aug. 31, 1979, Pat. No. 4,319,484.

[51] Int. Cl.$^4$ .............................................. G02B 5/14
[52] U.S. Cl. .................................. 250/227; 250/573; 356/133
[58] Field of Search .......... 250/573, 574, 575, 432 R, 250/227, 226, 344–346; 356/244, 246, 300, 311, 39, 133, 135–137; 73/861.05, 861.06

[56] References Cited

U.S. PATENT DOCUMENTS

| | | | |
|---|---|---|---|
| 3,303,699 | 2/1967 | Scott | 73/861.05 |
| 3,370,502 | 2/1968 | Wilks | 356/246 |
| 3,433,570 | 3/1969 | Hansen | 356/311 |
| 3,902,807 | 9/1975 | Fleming et al. | 356/51 |
| 3,975,084 | 8/1976 | Block | 250/574 |
| 4,302,677 | 11/1981 | Albertsson | 250/432 R |

*Primary Examiner*—David C. Nelms
*Attorney, Agent, or Firm*—Robert E. Archibald; Leonard W. Pojunas

[57] ABSTRACT

A generated signal is passed through an elongated signal conveying element positioned preferably perpendicular to the surface of a fluid the level of which is to be measured. The signal is directed from the signal conveying element to a detector element which senses the signal output from the signal conveying element. The signal output detected in an optical embodiment varies logarithmically with the depth of immersion of the signal conveying element into the fluid. A preferred embodiment employs an electromagnetic wave, e.g., light, signal which passes through a light pipe signal conveying element. By nearly matching the light pipe index of refraction with that of the fluid, a predetermined percentage of the wave is lost into the fluid each time the light is reflected further along the pipe. The portion of light sensed at the detector, which is located where the unrefracted light exits, is readily converted to an output which varies linearly with the depth the light pipe signal conveying element is immersed into the fluid length.

6 Claims, 7 Drawing Figures

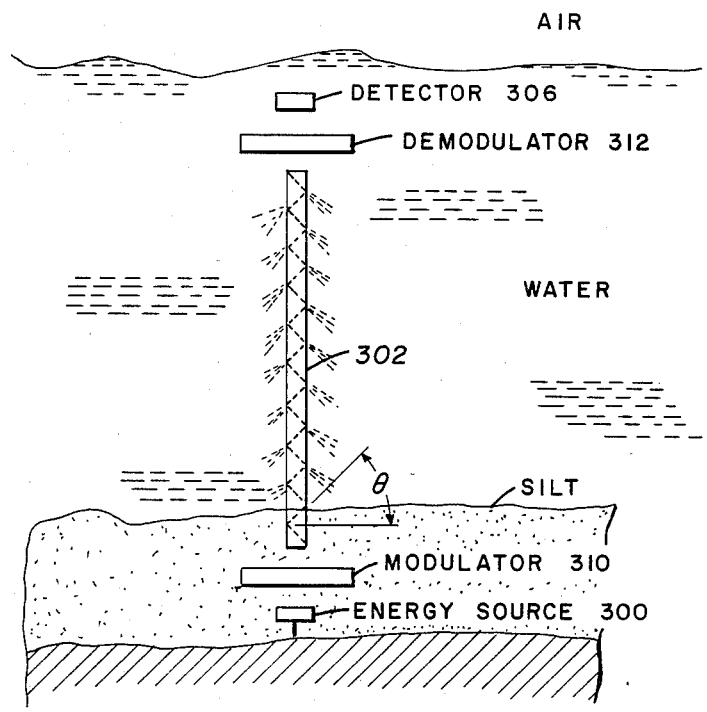
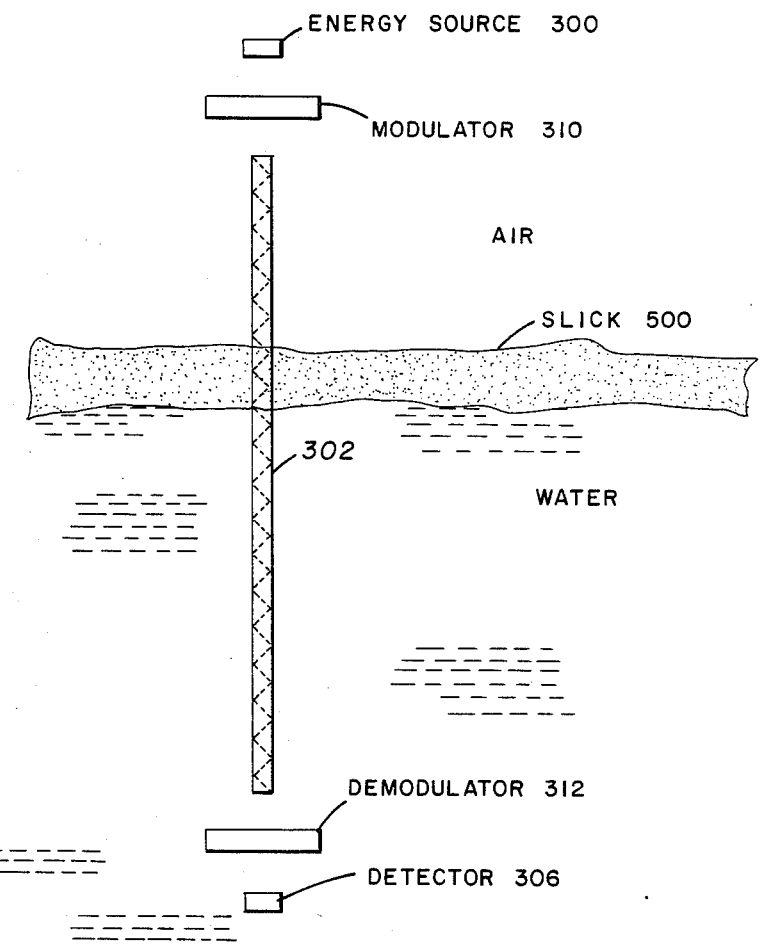

FIBER OPTIC FLUID IMPURITY DETECTOR

STATEMENT OF GOVERNMENTAL INTEREST

The invention described herein was made in the course of or under a contract or subcontract thereunder with the Department of the Navy.

CROSS-REFERENCE TO RELATED APPLICATION

This is a division of application Ser. No. 271,640, filed June 8, 1981, now U.S. Pat. No. 4,443,699, which is a division of application Ser. No. 71,704, filed Aug. 31, 1979, now U.S. Pat. No. 4,319,484.

TECHNOLOGICAL CONTEXT OF THE INVENTION

The concept of using an optical signal to indicate fluid level is known. U.S. Pat. No. 4,038,650 provides an element which reflects light when not in contact with a liquid and does not reflect light if there is contact with a liquid. U.S. Pat. No. 3,448,616 and U.S. Pat. No. 2,190,027 disclose liquid detecting devices which include a transparent rod, having an index of refraction similar to that of the liquid, the intensity of light passing through the rod being affected by the portion of the rod immersed in the liquid. However, neither patent considers the use of coherent light refraction, which is dependent on light wavelength and amplitude, has limited significance where the source of light is simply a lamp or the sun which does not strictly control amplitude or wavelength. The inventions described therein are thus less than optimal in detecting and measuring fluid levels. Further, neither exploits the logarithmic loss in light intensity experienced along a light pipe, having an index of refraction similar to that of a medium in which it is immersed, to measure fluid levels. U.S. Pat. No. 3,448,616 appears to teach away from the logarithmic relation by shaping a light reflecting rod into a frustroconical form. Instead of a logarithmic signal readily and accurately linearized for reading or analyzing, U.S. Pat. No. 3,448,616 provides a complicated output complexly related to the input light amplitude. U.S. Pat. No. 2,190,027, although providing an apparently cylindrical light rod, transmits light in random directions at random wavelengths and provides no means for measuring liquid level other than "an electrical indicator, relay, or similar device." While it suggests that gradations can be observed to indicate liquid level, how this is accomplished is unclear as evidenced by a passage in U.S. Pat. No. 3,448,616 which states that the earlier patent "determines only the presence of liquid at a particular level and does not provide knowledge of the actual level of the liquid". U.S. Pat. No. 4,038,650 discloses a fiberoptic fluid level detector probe. Like U.S. Pat. No. 2,190,027, this reference only indicates fluid presence and does not measure fluid level over a continuous length. The generating of a linear output (based on logarithmic losses along the rod) in response to level changes is not considered by the prior art.

SUMMARY OF THE INVENTION

In order to improve on prior technology, it is an object of the invention to provide a liquid level measuring device capable of measuring ocean waves or other varying fluid levels ranging in frequency to indicate low frequency or short period waves (0.5 Hz to 20 Hz) by providing a flat frequency response from dc to at least 20 Hz, depending on the sensor used.

It is also an object of the invention to provide a linear output response of generated voltage versus liquid level or wave amplitude generated voltage over a large dynamic range, the voltage being computer-compatible or digitizable to facilitate liquid level or wave date analysis. The generated voltage varies logarithmically with fluid level changes; passing the generated voltage through a conventional logarithmic amplifier thus produces broad range linearity.

It is yet another object to provide a system consisting of an array of devices which may operate from a common structure, i.e., a single oscillator driving all devices to supply fluid level data of a large area, and to determine wave characteristics and motion. The oscillator, or modulator, together with the array, can be used for nonlinear waves of wavelengths ranging from less than one millimeter to hundreds of meters, of wave heights to tens of meters, and of wave periods from milliseconds to tens of seconds. Data resulting from the array of devices provides a time series analysis of sea elevation and such characteristics as mean, variance, amplitude probability density, autocorrelation, and power spectral density.

It is still another object to provide a wave-measuring device which (1) avoids signal degradation due to crosstalk interference between transducers in an array, (2) is insensitive to salinity, and (3) may be used in fresh water, salt water or brackish water without requiring recalibration. U.S. Pat. No. 3,242,094 discusses the requirement of calibration for different geometries and fluids in which measurements are made. The invention minimizes this dependence.

As an object, the invention also achieves stable and long-term, low-power operation, thus limiting long-term drift with changes in environmental conditions.

As an instrument for sensitively measuring wave heights, the present invention provides a simple, inexpensive, and rugged instrument useful on buoys, piers or other platforms afloat at sea. The measurement of tides, storms, wind-driven waves, navigational hazards, erosion of bulkheads, oil spilling and oil recovery, earthquake-induced waves, structural fatique, sediment erosion, and erosion effects on harbors and docks is readily accomplished by the present invention. Further, as suggested by the prior art, the use of the present invention as a liquid level measuring device, especially for measuring fuel levels in vehicles such as aircraft, may be of significance to various industries.

The availability of software designed for analyzing data in a linear response system also enhances the versatility and value of the present invention.

It should also be noted that the invention, particularly in its optical embodiment, can be used to measure the thickness of a fluid layer (like an oil slick) by appropriately matching indexes of refraction. Similarly the presence of impurities or pollutants can be detected by measuring variations in signal output. The versatility of the invention is further suggested by use of the fluid level detector in a manometer or flowmeter application. That is, where a difference in pressure or a fluid flow is communicated to a reservoir whose level varies with pressure differential or flow velocity, respectively, the present invention can provide a simple, linear measurement of those variables.

Still further, in a synergistic fashion, the optical embodiment can transmit light at wavelength at the 254 nanometer, 280 nanometer, 320 nanometer, or other spectral lines which are biocidal in nature. The measuring of fluid level or ocean wave height while eliminating biofouling from the device is effected simultaneously with a single source of coherent light.

BRIEF DESCRIPTION OF THE DRAWINGS

FIG. 5 is a diagram showing the invention used to measure the height of silt build-up on an ocean or river bed.

FIG. 6 is a diagram showing the invention being used to measure the thickness of a film or slick carried atop another fluid.

DESCRIPTION OF THE INVENTION

Figure 1:
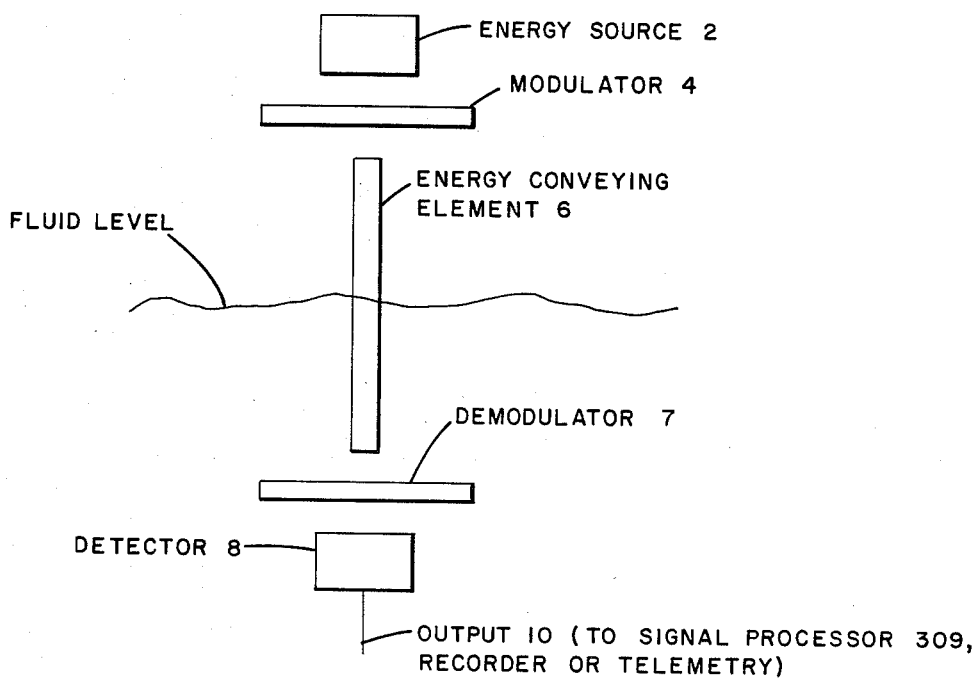
FIG. 1 is a general block diagram of the invention.

Referring to FIG. 1, an energy source 2 is shown feeding a signal to a modulator 4 before the signal enters an energy conveying element 6. A detector 8 senses the magnitude of energy from the conveying element 6 and demodulates the signal in demodulator 7 to recover only desired energy. The detector 8 can provide an output 10 which varies logarithmically with variations in a fluid level 12. A logarithmic output can be amplified in a conventional logarithmic amplifier to provide a linear output.

The fundamental operation of the apparatus of FIG. 1 is to transmit energy of a particular waveform or wavelength through a conveying element 6 the signal output of which can be rendered linear over a wide dynamic range. In accordance with the invention, an optical embodiment which operates in this fashion is set forth.

Figure 2:
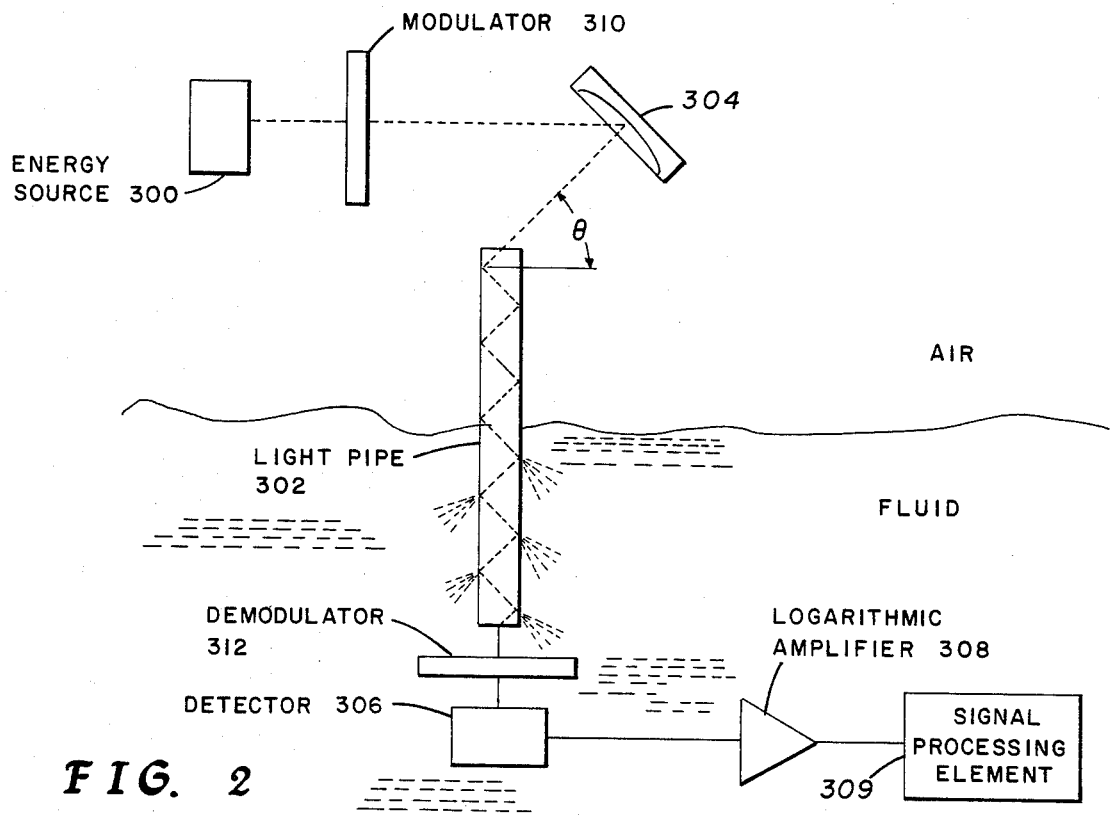
FIG. 2 is a diagram showing an optical embodiment of the invention.

An optical fluid level, or wave height, measuring apparatus of the present invention is embodied in FIG. 2. A source of electromagnetic radiation 300 provides its output to a light pipe 302 which has an index of refraction similar to that of the fluid in which the light pipe 302 is partially immersed. Light is reflected numerous times along the inside of the light pipe 302 with insignificant losses until it reaches the air-fluid interface shown in FIG. 2. When the light passes through the immersed portion of the light pipe 302, both reflection and refraction occur. To permit this reflection and refraction, the light must be introduced into the light pipe 302 at an angle (based on the critical angle for the material and wavelength). A pivotal reflector 304 can properly direct the light. It has been determined that the loss of light due to refraction occurring at each reflection along the immersed portion of the light pipe 302 is logarithmic in nature. The light amplitude reaching a detector 306 is thus a logarithmic function based on the number of reflections and the reflection: refraction ratio at the immersed portion. Connecting the output of detector 306 to a logarithmic amplifier 308 yields an essentially linear response output to fluid level variations. A significant advantage in linearizing the output resides in the ease of later processing the detected signals. Signal processing apparatus 309 (usable can digitize, record, and manipulate data from the signal. Wave height and wave motion characteristics, fluid level changes, and other level-related functions can be examined with currently existing hardware and software designed for linear systems.

To avoid stray electromagnetic effects, a modulator 310 is provided with the source 300 and a demodulator 312 can be located to detect the particular modulated light put out by the light pipe 302. The modulator 310 and demodulator 312 provide spectral filtering and can also provide pulse, phase, or code modulation. By limiting the light to coherent light of a specific wavelength or spectral line, the refraction or absorption of the light in the fluid is predictable. The effects of variations in ambient lighting are also minimized by confining the light to a wavelength which does not vary. Coding or phase-locking the signals entering and exiting the light pipe 302 also minimizes ambient light variations effects.

A significant advantage can be achieved by providing coherent light at the 254 nm, 280 nm, or 320 nm spectral lines. In addition to minimizing ambient effects where the ozone layer filters out almost all ultraviolet at the 254 nm wavelength, light at 254 nm (as well as 280 nm and 320 nm) has a biocidal effect on marine fouling. That is, microorganisms and larger biofouling organisms are destroyed or repelled by such light. The use of ultraviolet light thus provides the triple purpose of measuring fluid level, keeping the light pipe 302 free of marine fouling, and generating a single wavelength of light which minimizes the effects of unwanted light inputs.

The source 300 preferably generates a collimated beam of light. The source 300 may be a laser or a general source of focussed light. Less preferably, the source can include any type of infrared light, including sunlight, which shines on the light pipe 302. Such a source would require automatic gain control to compensate for changes in sky irradiance. The wavelength where such photon energy peaks must be known if measurements are to be meaningful, as previously suggested.

Derivative Applications of the Invention

The present invention is amenable to numerous significant uses and embodiments.

Figure 3:
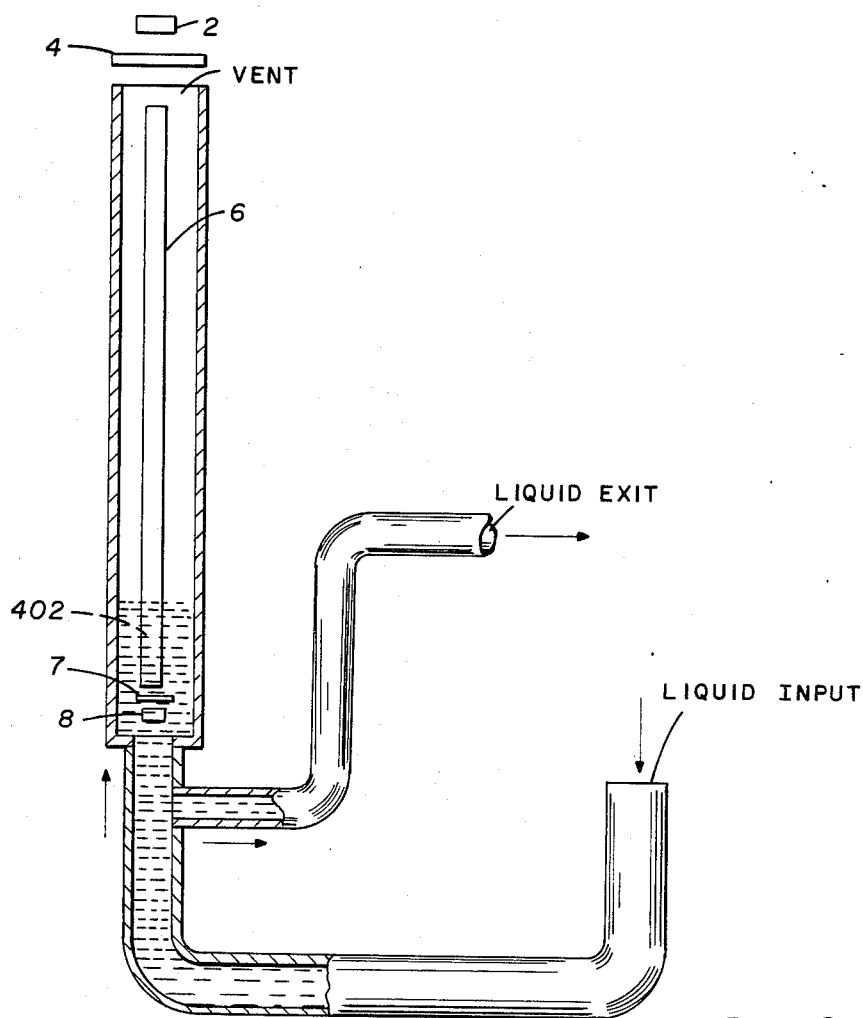
FIGS. 3 and 4 are diagrams illustrating the use of the invention in measuring pressure differentials and fluid velocity for a liquid and gas, respectively.
Figure 4:
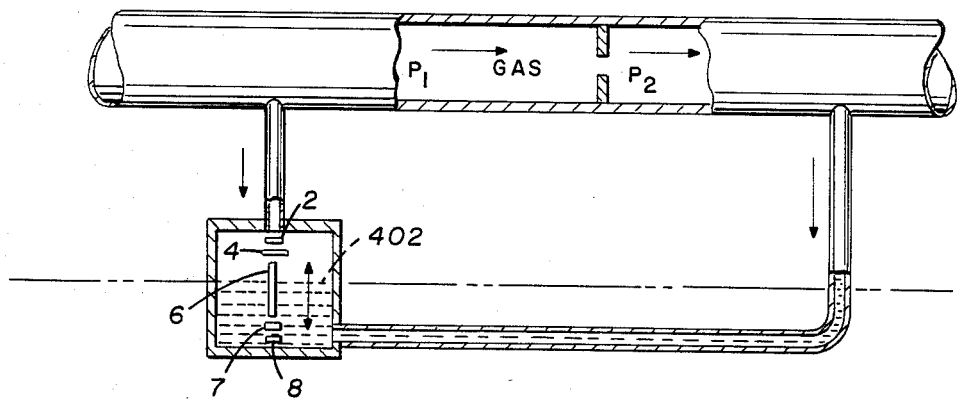
Figure 7:
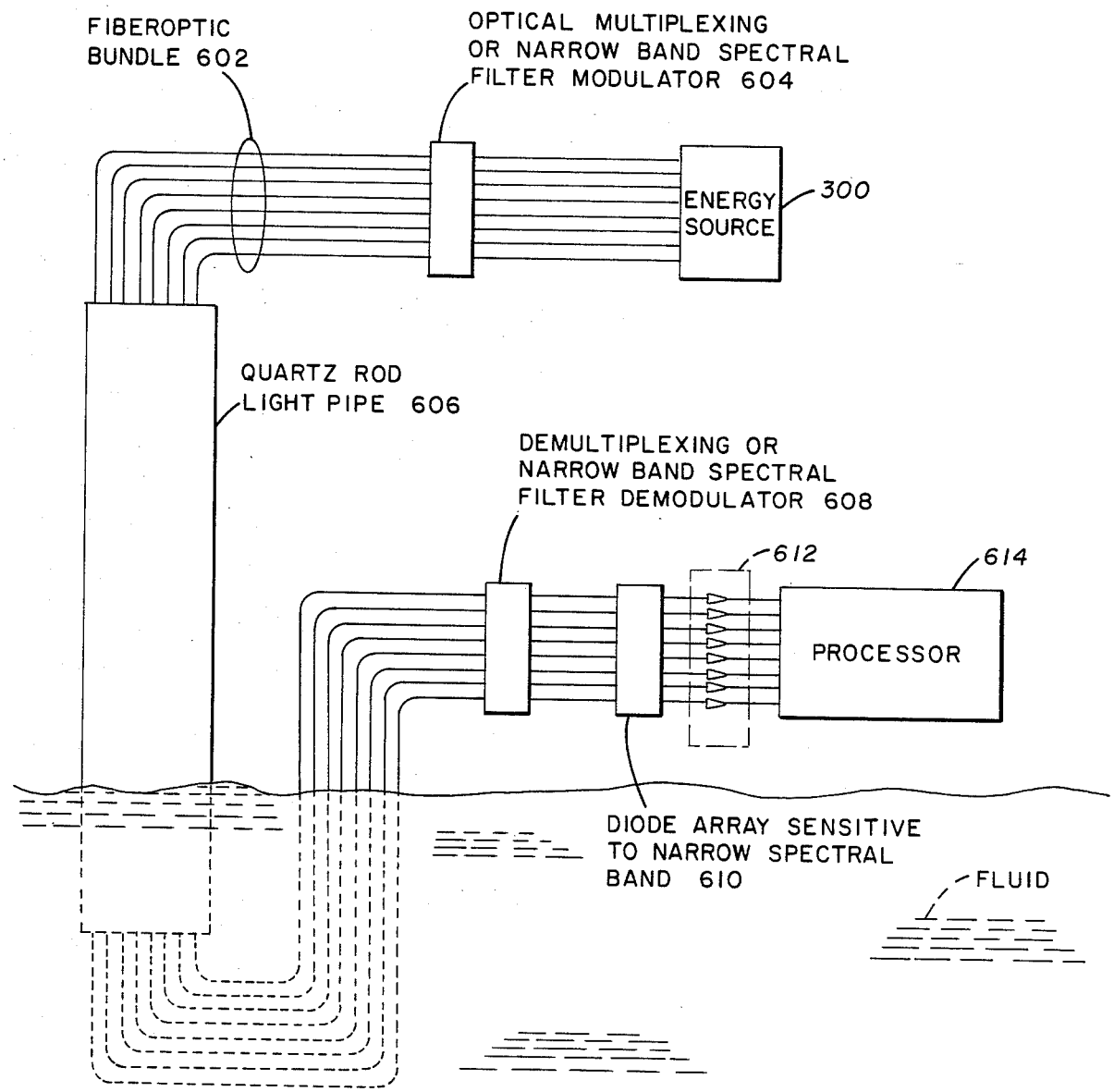
FIG. 7 is a diagram illustrating an aspect of the optical embodiment of the present invention in identifying impurities in a fluid or on the light pipe of the optical embodiment which might be useful in making accurate fluid level measurements.

In FIGS. 3 and 4, the measurement of liquid or gas velocity or pressure differential ($P_2 - P_1$) is made by use of the present invention. Specifically, as liquid or gas velocity or pressure differential varies, the level of a fluid in a reservoir 402 varies accordingly. With the optical fluid level embodiment immersed in the fluid, the changes in fluid level can be measured to provide an indication of pressure differential or liquid flow or gas flow velocity. The energy source 2, modulator 4, conveying element 6, demodulator 7, and detector 8 discussed with reference to FIG. 1 are similarly shown in FIGS. 3 and 4.

In FIGS. 5 and 6, the optical embodiment and its theory is adapted for use in measuring layers. In FIG. 5, apparatus for measuring silt build-up on an ocean or river bed is shown. By anchoring the source end of the light pipe 302 to an ocean or river floor the amount of energy transferred to the detector 8 extending up into the water can provide a measure of silt build-up. Because light will reflect where silt surrounds the light pipe 302 and will reflect and refract where surrounded by water, the light sensed at the detector 8 will provide an accurate measure of silt build-up. FIG. 6 measures, in similar fashion, the thickness of a fluid slick 500 which has an index of refraction comparable to the index of refraction of the light pipe 302. That is, the level of the slick 500 (e.g. oil) above the water level is measured by passing the light pipe 302 through the slick 500, transmitting light therethrough, and measuring the amplitude of light not lost due to refraction in the slick 500.

Finally the invention is particularly adaptive for use in detecting impurities in a fluid medium, like ocean or river water. Impurities or pollutants in water affect light refraction, or absorption, in a characteristic manner. By determining the signatures of known pollutants or impurities and programming them into a processor 309, the presence of a particular impurity based on signal variations in an optical system can be detected. The presence of pollutants or impurities in the fluid can be detected by measuring changes in detected energy over a spectrum of energy wavelengths carried by a fiberoptic-bundle 602 from a multiplexer or filter modulator 604 as shown in FIG. 10. Wavelengths at which refraction losses peak provide indicators of which pollutants or impurities are present. The magnitude of energy amplitude variation from the norm (i.e., with a clean light pipe 606 such as a quartz rod in a pure fluid) provides a measure of the impurity concentration. The signal at each wavelength passes through a demultiplexing or filter demodulator 608, is spectrally analyzed by a diode array 610, amplified in element 612, and processed and/or telemetered by element 614. This application naturally suggests yet another possible use, namely the measurement of fluid flow where impurities are intentionally introduced into a flowing fluid in which a plurality of energy conveying light pipes 606 are provided. By sensing when the impurity is detected by each pipe 606, the speed and direction of the fluid flow through an array of such elements can be determined and recorded.

It should be noted that the energy source 2, modulator 4, and signal processing element 309 (of FIG. 1) may be common to a plurality of elements placed in an array or matrix.

Further, the output from the present invention, in addition to being processed, may be telemetered to a remote location by conventional means (before or after processing).

Various modifications, adaptations and alterations to the present invention are of course possible in light of the above teachings. It should therefore be understood at this time that within the scope of the appended claims, the invention may be practiced otherwise than was specifically described hereinabove.

What is claimed is:

1. Apparatus for detecting the presence of at least one of a plurality of possible impurities having known energy absorption characteristics in a fluidic medium, comprising:
   a source of electromagnetic energy,
   an energy conveying element immersed in the fluidic medium,
   means for spectrally filtering the energy from the source into signals at each specific wavelength at which each corresponding impurity absorbs maximum energy,
   a multiplexer means for multiplexing each provided specific wavelength signal into the energy conveying element in spectral bands,
   means, coupled to the output from the energy conveying element, for receiving the response of each specific wavelength signal within spectral bands,
   an amplifier connected to separately amplify the signals at each spectral band, and
   means for analyzing the specific wavelength signals in each spectral band to determine which at least one of the corresponding possible impurities are present.

2. An apparatus as in claim 1, the energy conveying element comprising a light pipe.

3. An apparatus as in claim 2, the source radiating in the optical range.

4. Apparatus for detecting the presence of at least one particular impurity having known energy absorption characteristics in a fluidic medium, comprising:
   a source of electromagnetic energy,
   a plurality of energy conveying elements immersed in the fluidic medium,
   means for spectrally filtering the energy from the source and providing a signal at a specific wavelength at which the particular impurity absorbs maximum energy,
   means for directing the provided specific wavelength signal into the energy conveying elements,
   means, coupled to the output from the energy conveying elements, for separately detecting the response at the specific wavelength at each energy conveying element to determine if the particular impurity is present, and
   means, connected to the means for separately detecting, for comparing the times at which the impurity is sensed at each energy conveying element and for analyzing the flow velocity of the fluidic medium based on the particular impurity detection.

5. An apparatus as in claim 4, the energy conveying elements comprising light pipes.

6. An apparatus as in claim 5, the source radiating in the optical range.

* * * * *